(12) United States Patent
Bushey et al.

(10) Patent No.: US 12,418,546 B2
(45) Date of Patent: Sep. 16, 2025

(54) SYSTEM AND METHOD FOR PREDICTING INVESTIGATION QUERIES BASED ON PRIOR INVESTIGATIONS

(71) Applicant: KPMG LLP, New York, NY (US)

(72) Inventors: Gary A. Bushey, Youngsville, NC (US); Hrisheek Radhakrishnan, Atlanta, GA (US); Tarun Sondhi, Ashburn, VA (US)

(73) Assignee: KPMG LLP, New York, NY (US)

( * ) Notice: Subject to any disclaimer, the term of this patent is extended or adjusted under 35 U.S.C. 154(b) by 302 days.

(21) Appl. No.: 17/657,689

(22) Filed: Apr. 1, 2022

(65) Prior Publication Data

US 2023/0319062 A1 Oct. 5, 2023

(51) Int. Cl.
*H04L 29/06* (2006.01)
*G06F 16/9538* (2019.01)
*H04L 9/40* (2022.01)

(52) U.S. Cl.
CPC ...... *H04L 63/1416* (2013.01); *G06F 16/9538* (2019.01)

(58) Field of Classification Search
CPC ............. H04L 63/1416; H04L 12/2494; H04L 1/27455; G06F 16/9538; G06F 1/1692; G06F 16/7335; G06F 17/30831; G06F 17/30837; G06F 2206/1008; G06F 16/2423; G06F 8/427; G06F 17/2705; G06F 40/205; G06F 16/156; G06F 16/245; G06F 16/24553; G06F 16/248; G06F 16/3331; G06F 16/835; G06F 17/30126; G06F 17/30389; G06F 17/30392; G06F 17/30395; G06F 17/30398; G06F 17/30424; G06F 17/30483; G06F 2201/86; H04M 1/7243; H04M 1/72547; H04M 3/493; H04M 2242/08; H04M 1/0218; H04M 1/0229; H04M 1/724631; H04M 2203/25; H04M 2203/255; H04M 2203/256; H04M 2250/02; H04M 15/8278; H04M 2215/788; H04N 1/32776; H04N 13/0003;
(Continued)

(56) References Cited

U.S. PATENT DOCUMENTS 8,874,550 B1 * 10/2014 Soubramanien ........ G06F 21/00
707/731
2018/0089258 A1 3/2018 Bhattacharjee et al.
(Continued)

OTHER PUBLICATIONS

International Searching Authority, PCT International Search Report and Written Opinion, International Application No. PCT/US23/15632, Jun. 21, 2023, pp. 1-15.

*Primary Examiner* — Joseph P Hirl
*Assistant Examiner* — Leynna Truvan
(74) *Attorney, Agent, or Firm* — Hunton Andrews Kurth LLP (57) ABSTRACT

An embodiment of the present invention is directed to predicting investigation queries based on prior investigations. An embodiment of the present invention leverages the knowledge of the existing experienced analysts to assist and guide newer or less experienced analysts through incident investigations. By analyzing queries that have been run previously, and utilizing machine learning, an embodiment of the present invention may mimic the knowledge of experienced and/or existing analysts by automatically running those queries against similar incidents.

20 Claims, 6 Drawing Sheets

(58) Field of Classification Search
CPC ............... H04N 13/0059; H04N 21/00; H04N 21/43074; H04N 21/8545; H04N 2005/4456; H04N 1/0035; H04N 1/00501; H04N 1/32577; H04N 5/23216; H04N 5/232933; H04N 21/472; H04N 21/475; H04N 21/482; H03K 19/0175; H04Q 2213/13175; H04Q 2213/13525; H04W 52/0267; H04W 48/14; H04W 12/08; H04W 36/0038; H05K 7/1481; G05B 2219/35431; G05B 2219/13144; G06K 19/0716; G08B 13/19678; G08B 13/19682; G08B 13/19669; G08C 2201/30; G06V 40/67; G06V 20/44; G10L 2015/063; G10L 2015/0638; G08G 1/162

See application file for complete search history.

(56) References Cited

U.S. PATENT DOCUMENTS

2020/0042648 A1* 2/2020 Rao ..................... G06F 16/2457
2021/0281583 A1* 9/2021 Okunlola ................ G06F 40/30

* cited by examiner

SYSTEM AND METHOD FOR PREDICTING INVESTIGATION QUERIES BASED ON PRIOR INVESTIGATIONS

FIELD OF THE INVENTION

The present invention relates to systems and methods for predicting queries and more specifically to predicting investigation queries based on prior investigations.

BACKGROUND

Managed Detection and Response (MDR) generally relates to outsourced cybersecurity services to protect data and assets. MDR combines technology and human expertise to identify threats. Currently, it is difficult to find enough qualified and experienced security analysts to perform managed detection and response services. Finding a sufficient number of well-trained security analysts is an issue affecting almost every company. There are many open positions and not enough trained professionals to fill those positions.

With current security information and event management (SIEM) systems, each analyst would need to generate queries and run the queries themselves. Analyst would need to know which query to run and a new analyst will not have that knowledge.

It would be desirable, therefore, to have a system and method that could overcome the foregoing disadvantages of known systems.

SUMMARY

According to one embodiment, the invention relates to a computer-implemented system for predicting investigation queries based on prior investigations. The system comprises: an interactive user interface that is configured to receive one or more inputs; an interface that communicates with a security information and event management (SIEM) system; and a computer processor executing on a computer server and coupled to the interactive user interface and the interface, the computer processor further configured to perform the steps of: receiving, via an input interface, a new alert relating to an incident event wherein the incident event comprises one or more category types; determining, via the computer processor, whether the new alert is similar to a prior investigation based on having a set of category types that match the one or more category types; responsive to the new alert having the set of category types that match the one or more category types, identify a parsed query from the prior investigation; based on the new alert, updating one or more variables associated with the parsed query; initiating execution of the parsed query with updated one or variables via the SIEM system; receiving and storing results of the executed parsed query; and displaying, via the interactive user interface, the executed parsed query and corresponding results of the parsed query.

According to one embodiment, the invention relates to a computer-implemented method for predicting investigation queries based on prior investigations. The method comprises the steps of: receiving, via an input interface, a new alert relating to an incident event wherein the incident event comprises one or more category types; determining, via a computer processor, whether the new alert is similar to a prior investigation based on having a set of category types that match the one or more category types; responsive to the new alert having the set of category types that match the one or more category types, identify a parsed query from the prior investigation; based on the new alert, updating one or more variables associated with the parsed query; initiating execution of the parsed query with updated one or variables via a security information and event management (SIEM) system; receiving and storing results of the executed parsed query; and displaying, via an interactive user interface, the executed parsed query and corresponding results of the parsed query.

An embodiment of the present invention allows analysts to utilize the knowledge and experience of the other analysts that have already investigated similar incidents. An embodiment of the present invention leverages knowledge of advanced analysts to help less experienced analysts come up to speed. When an analyst performs an incident investigation, the analyst may generate and run various queries against sources of data. An embodiment of the present invention records those queries with analyst details (e.g., who made the queries, etc.) and/or other incident information. This information may be stored and managed in a repository using machine learning. An embodiment of the present invention may parse the queries and determine which parts of the queries are variables that may be modified and which parts remain static. When a new incident is created, an embodiment of the present invention may determine if there are any queries in the repository that match the incident. If so, those queries may be automatically executed and presented to the analyst via an interactive user interface.

An embodiment of the present invention enables an entry level security analyst (L1) to have the knowledge normally associated with an experienced analyst (L2/L3). An embodiment of the present invention may identify queries generated and executed by experienced analysts. These queries may be applied to similar incidents and alerts thereby increasing accuracy and consistency. This further enables entry level security analysts (L1) to rely on more accurate and targeted queries than possible at their level. With an embodiment of the present invention, an entry level analyst may execute queries and review results that a more experienced analyst would have executed. This enables entry level analysts to perform at a higher level and have access to advanced tools to perform incident investigation in a comprehensive and consistent manner.

These and other advantages will be described more fully in the following detailed description.

BRIEF DESCRIPTION OF THE DRAWINGS

In order to facilitate a fuller understanding of the present invention, reference is now made to the attached drawings. The drawings should not be construed as limiting the present invention, but are intended only to illustrate different aspects and embodiments of the invention.

DETAILED DESCRIPTION

Exemplary embodiments of the invention will now be described in order to illustrate various features of the invention. The embodiments described herein are not intended to be limiting as to the scope of the invention, but rather are intended to provide examples of the components, use, and operation of the invention.

An embodiment of the present invention is directed to predicting investigation queries based on prior investigations. An embodiment of the present invention leverages the knowledge of the existing experienced analysts to assist and guide newer or less experienced analysts through incident investigations. By analyzing queries that have been run previously, and utilizing machine learning, an embodiment of the present invention may mimic the knowledge of experienced and/or existing analysts by automatically running those queries against similar incidents. This will improve analyst investigations through efficiencies in resources, time and training. In addition, a consistent and comprehensive approach may be realized for various incident investigations across analysts of varying experience levels and skillsets.

An embodiment of the present invention may record queries that Security Operations Center (SOC) analysts use when performing alert investigations. Other information that may be captured include analyst data, incident information, results data, etc. For example, analyst data may include analyst's level, experience as well as Mean Time To Closure (MTTC). This information may be used to help rank the queries. Other factors and characteristics may be recorded. An event may represent a change of normal behavior for a given system, process, environment, workflow, etc. An alert may represent a notification that an event occurred. For example, an alert include a notification that a specific attack has been directed at an organization's information systems. An Incident may represent a change in a system that negatively impacts an organization or business. This may include an occurrence that actually or potentially impacts confidentiality, integrity and/or availability of information or constitutes a violation or threat of violation of security policies and procedures. According to an embodiment of the present invention, queries may be run against alerts, incidents, etc.

Utilizing Machine Learning (ML), an embodiment of the present invention may then parse the queries to determine which portions of the query change depending on the incident being investigated and which portions remain static. The portions that change may represent query variables that change depending on the incident, system, environment, industry, etc.

When a new alert is generated, an embodiment of the present invention may determine whether the new alert is similar to ones that have already been analyzed. Similarity may be determined by various factors including incident type, event type and/or other characteristics. Similarity thresholds or triggers may also be adjusted. For example, if a similar incident is detected and a query is applied, feedback from the actual query and incident investigation may be used to adjust similarity thresholds or triggers. If a similarity is detected, an embodiment of the present invention may automatically update any variables and run the previously parsed queries against the current alert/incident.

The output from these queries may be stored and associated with the alert so that analysts may then view the results. Output and results data may be used to further train and refine the machine learning models.

Figure 1:
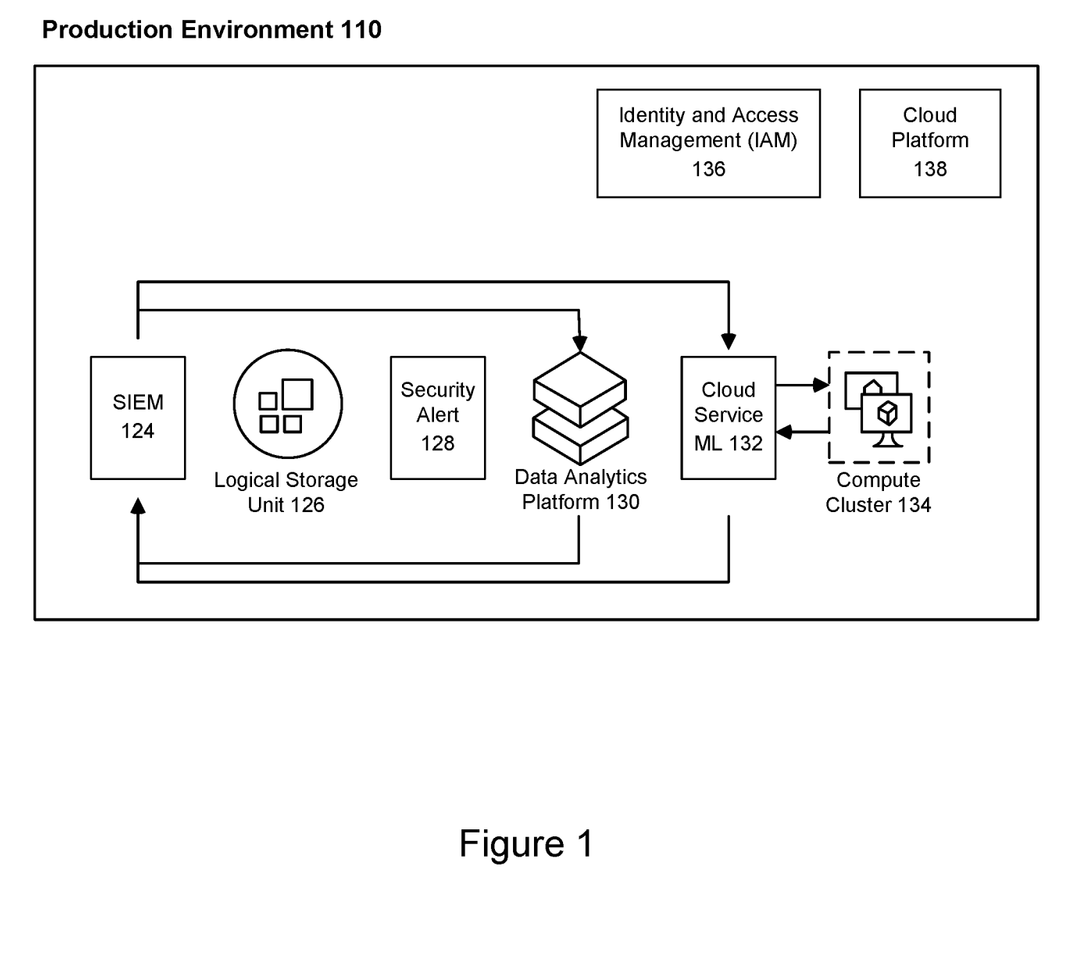
FIG. 1 is an exemplary architecture diagram, according to an embodiment of the present invention.

FIG. 1 is an exemplary architecture diagram, according to an embodiment of the present invention. This architecture diagram represents an exemplary implementation of the predictive investigation queries system using a cloud platform.

FIG. 1 illustrates an exemplary environment, such as Production Environment 110 which includes services such as Identify and Access Management (IAM) 136 and Cloud Platform 138. In this example, IAM may securely control access various resources. FIG. 1 illustrates SIEM 124, Logical Storage Unit 126, Security Alert 128, Data Analytics Platform 130, Cloud Service ML 132 and Computer Cluster 134.

SIEM 124 may represent a scalable cloud native security information and event management (SIEM) and security orchestration, automation and response (SOAR) solution. SIEM may represent a security solution that helps organizations and other users recognize potential threats and vulnerabilities before they have a chance to disrupt business operations. SIEM solutions may perform data aggregation, consolidation and sorting to identify threats and comply with data requirements. Analysts may utilize SIEMs to investigate alerts and run queries. SIEMs may provide the necessary incident data, analyst query actions, and success metrics that may be used by machine learning to parse and predict investigation queries. Predicted queries may leverage the SIEM to automatically execute predicted queries upon similar incident triggers.

Logical Storage Unit 126 may represent a storage unit that stores, retains and queries data collected from various resources. Logical Unit Storage 126 may represent a database or other repository. For example, Logical Storage Unit 126 may represent a data solution configured to store data in a particular workspace.

Security Alert 128 may represent notifications that are generated when certain activity is detected. The activity may represent anomalies or other unexpected behavior.

Data Analytics Platform 130 may be optimized for a cloud services platform. Data Analytics Platform 130 may offer an integrated end-to-end machine learning environment incorporating managed services for experiment tracking, model training, feature development and management, and feature and model serving. Data Analytics Platform 130 may collect incident data, analyst query actions, and success metrics from SIEM 124 to train and run the machine learning model used for parsing and predicting investigation queries.

Cloud Service ML 132 may represent a cloud service for accelerating and managing a machine learning project lifecycle. Cloud Service ML 132 may also collect incident data, analyst query actions, and/or success metrics from SIEM 124 to train and run the machine learning models used for parsing and predicting investigation queries.

Compute Cluster 134 may represent managed-compute infrastructure used to distribute a training or batch inference process across a cluster of CPU or GPU compute nodes in the cloud. Compute Cluster 134 may provide the necessary compute and processing required to train and run the machine learning models.

Figure 2:
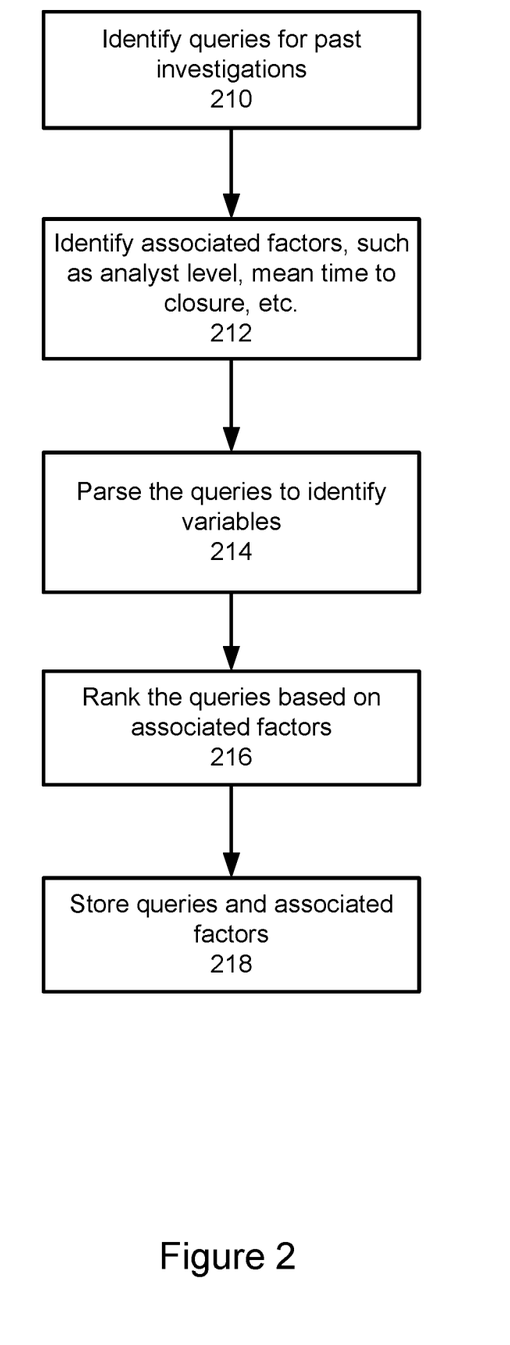
FIG. 2 is an exemplary flowchart, according to an embodiment of the present invention.

FIG. 2 is an exemplary flowchart, according to an embodiment of the present invention. At step 210, queries may be identified for past investigations. At step 212, associated factors may be identified. At step 214, the queries may be parsed to identify variables. At step 216, the queries may be ranked based on the associated factors. At step 218, the queries and associated factors may be stored. While the process of FIG. 2 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 210, queries may be identified for past investigations. An analyst may investigate an alert and run a query to obtain more information. Past investigations may relate to various security related incidents from SIEM and other systems. Other sources of data may be accessed for prior queries and investigation related information.

At step 212, associated factors may be identified. Factors may include analyst data, incident information, results data, etc. Examples may include the type of incident, what queries were run by which analysts, the level of the analyst, how quickly and effectively the incident was mitigated (e.g., Mean Time To Closure—MTTC), etc.

At step 214, the queries may be parsed to identify variables. Using Machine Learning, an embodiment of the present invention may parse the query to identify variables and static parameters. Variables may represent portions of a query that may change for an incident whereas static parameters stay constant for incidents. For example, a source system may be a static parameter. An IP address may be considered a variable because it would depend on each incident. Static parameters and variables may depend on the client system, application, industry, etc.

At step 216, the queries may be ranked based on the associated factors. Factors may include Mean Time To Remediate (MTTR), analyst level (e.g., L1, L2, L3), incident type, etc.

At step 218, the queries and associated factors may be stored. The queries and factors may be stored in a repository or other storage component or system.

Figure 3:
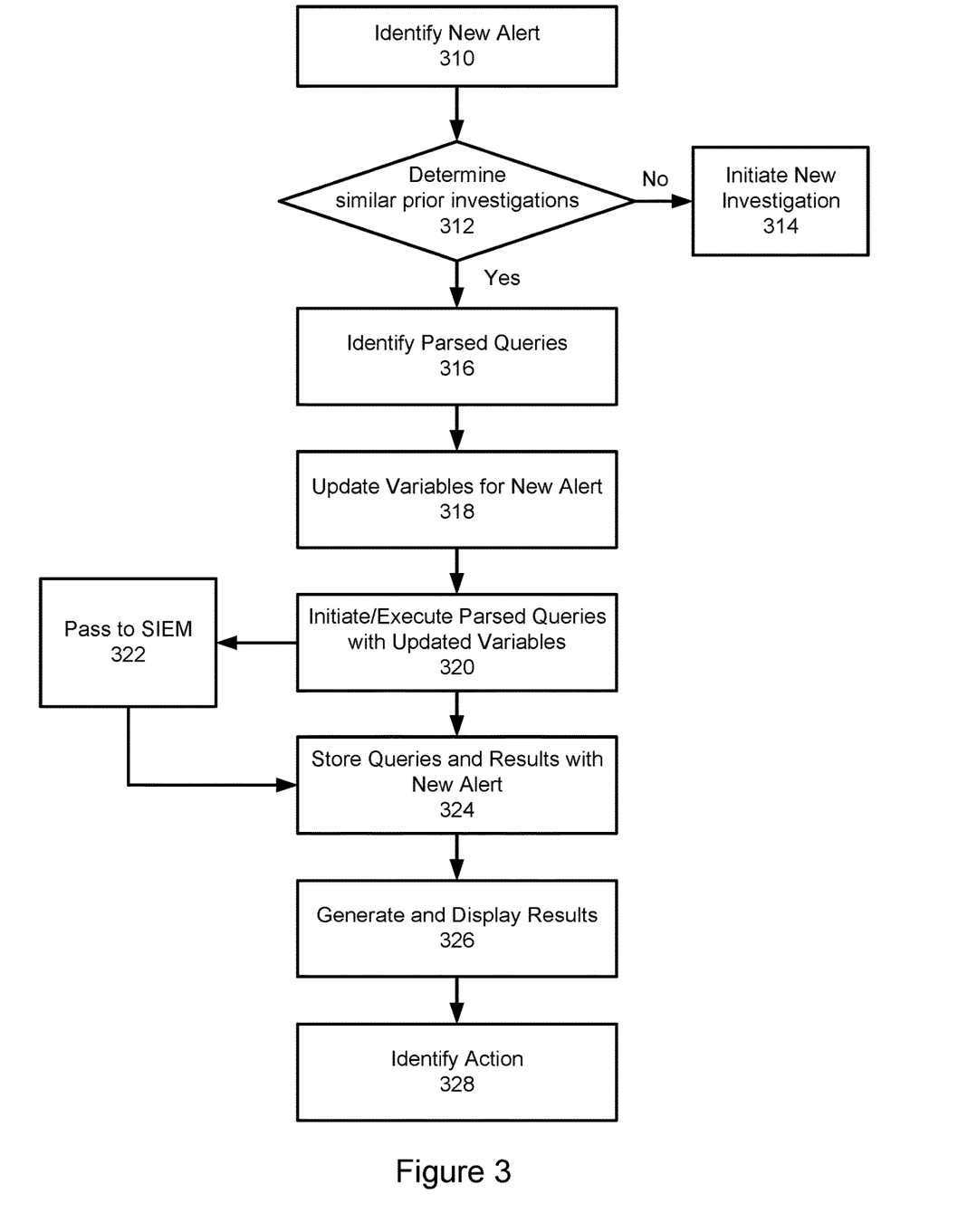
FIG. 3 is an exemplary flowchart, according to an embodiment of the present invention.

FIG. 3 is an exemplary flowchart, according to an embodiment of the present invention. At step 310, a new alert may be identified. At step 312, an embodiment of the present invention may determine whether similar prior investigations have been analyzed. If not, a new investigation may be performed at step 314. If yes, parsed queries may be identified at step 316. At step 318, variables may be updated for the new alert. At step 320, the parsed queries may be executed with the updated variables. The parsed queries may be passed to a SIEM system for execution of the queries at step 322. The results may be received and then stored at step 324. At step 326, the results may be obtained and displayed through a user interface. At step 328, an appropriate action may be determined. While the process of FIG. 3 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 310, a new alert may be identified. The new alert may relate to an incident or other potential security issue. The alert may be identified or generated from a SIEM system, for example. The incidents may vary and depend on a client system, for example.

At step 312, an embodiment of the present invention may determine whether similar prior investigations have been analyzed. If a similar incident is identified, an embodiment of the present invention may identify parsed queries at step 316.

For example, when a new alert is generated, the machine learning system may examine the incident and determine if it is similar to one it has already parsed and, if so, determine the variables needed. According to an embodiment of the present invention, when an incident is generated, relevant queries may be automatically executed without an analyst to decide which queries to generate and execute. This may be particularly useful for an entry level analyst. Analysts may view the results from such queries and have a better understanding of the entire incident.

An embodiment of the present invention may not identify a match or other incidents having close enough similarities. If a similar incident is not identified, a new investigation may be performed at step 314. In addition, an embodiment of the present invention may use this information as part of a training process for machine learning. Here, an experience analyst may run queries and the results may be applied to a training database or other repository.

At step 318, variables may be updated for the new alert.

At step 320, the parsed queries may be executed with the updated variables. Using Machine Learning, an embodiment of the present invention may then generate the queries, with the variables filled in, based on the data collected and in relation to the current incident.

The parsed queries may be passed to a SIEM system for execution of the queries at step 322. The SIEM may execute the queries and then associate the results with the new alert.

The results may be received and then stored at step 324.

At step 326, the results may be obtained and displayed through an interactive user interface. Additional details are provided in connection with FIG. 6 below.

At step 328, an appropriate action may be determined. The action may relate to an action that addresses the incident or event. For example, the analyst may determine whether to investigate further, run additional queries, ignore the incident or perform other actions. This information may be used by the system to further refine and fine-tune the applied queries. For example, the appropriate action may be determined based on the information provided through the user interface. If the incident turns out to be a false positive or a more severe incident than originally expected, this information may be used to revise or confirm certain queries that were applied. An embodiment of the present invention may provide a recommended action or other suggestion based on prior incident investigation and/or other sources of information. Other variations may be realized and implemented.

Figure 4:
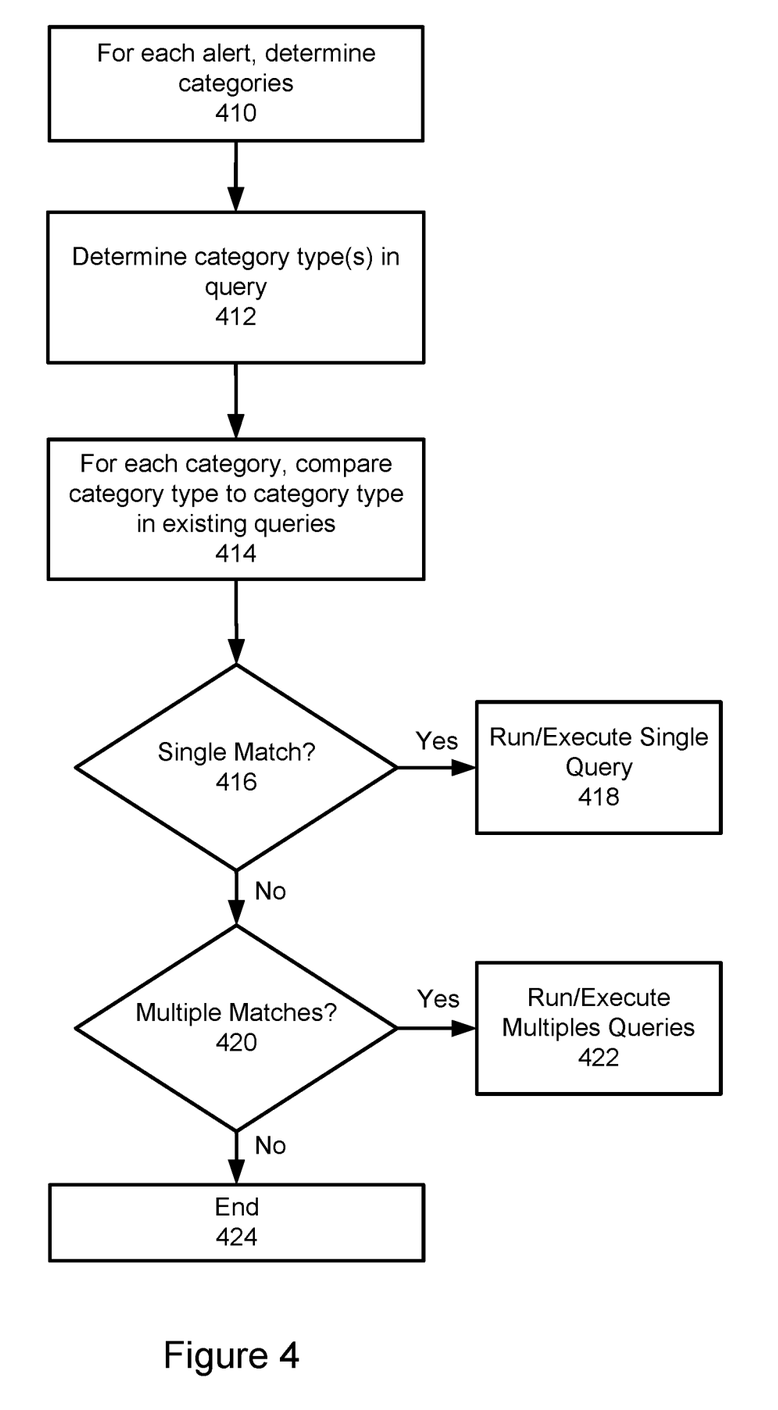
FIG. 4 is an exemplary flowchart, according to an embodiment of the present invention.

FIG. 4 is an exemplary flowchart, according to an embodiment of the present invention. At step 410, for each alert, one or more categories may be determined. At step 412, a category type for each category may be determined. At step 414, for each category, a comparison of category type may be performed. For a single category at 416, a single query may be executed at step 418. For multiple categories at 418, a combination of queries may be executed at step 422. While the process of FIG. 4 illustrates certain steps performed in a particular order, it should be understood that the embodiments of the present invention may be practiced by adding one or more steps to the processes, omitting steps within the processes and/or altering the order in which one or more steps are performed. Additional details for each step are provided below.

At step 410, for each alert, one or more categories may be determined.

According to an exemplary illustration, a SIEM system may expose one or more pieces of information from each incident. An alert may contain data items that may be classified into categories. Data items may represent information extracted from the query's results used to categorize the query. For example, each category may have a specific type including Account, Host, IP address, Malware, File, Process, Cloud application, Domain name, Cloud resource, File hash, Registry key, Registry value, Security group, URL, IoT device, Mailbox, Mail cluster, Mail message, Submission mail and others.

At step 412, a category type for each category may be determined. Using Machine Learning, an embodiment of the present invention may determine the category type that will be represented in a query when it performs a determination of variables.

For example, an illustrative query relates to "AADRisky Users" based on a User Principle Name==testuser@company.com.

From table RiskyUsers
Extract data for the last 30 days
Where the User Principal Name==testuser@company.com
Where Login Type="interactive"
Show User Display Name, Risk State, Risk Detail In this query, the ML module may determine that testuser@company.com is a variable and it is an Account type due to the formatting of the data. The ML module may also determine that "interactive" is not a variable as it is part of the query.

According to an embodiment of the present invention, some categories may fit multiple category types. For example, a data item include "192. ###0.1.1" that may be both a Host and an IP Address. In this case, the query that uses this category may be classified as able to run for both categories.

At step 414, for each category, a comparison of category type may be performed. For each category in a new alert, the type of the category may be compared to a listing of existing queries in the ML module that may be run. This information may be used to determine whether there is a match.

For a single category at 416, a single query may be executed at step 418. If the incident has a single category as determined by step 416 and that category type matches a variable type from the query stored in the ML module, the query will be executed at step 418.

For multiple categories at 418, a combination of queries may be executed at step 422. If the incident has multiple categories as determined by step 420, each category may be grouped with all the others and those combinations may be used to determine if there is a query that has multiple variables that will match, at step 422.

For example, if the incident has an Account and a Host category, all the queries associated with the Account category will run, all the queries associated with the Host category will run, and any queries associated with both Account and Host categories will run.

According to another example, if the incident has an Account category, a Host category, and a IP Address category, all the queries associated with the Account category will run, all the queries associated with the Host category will run, all the queries associated with the IP Address will run, all the queries associated with BOTH Account and Host categories will run, all the queries associated with BOTH Account and IP Address categories will run, all the queries associated with BOTH Host and IP Address categories will run, all the queries associated with ALL the Account, Host, and IP Address categories will run. Additional queries and variations may be supported.

Figure 5:
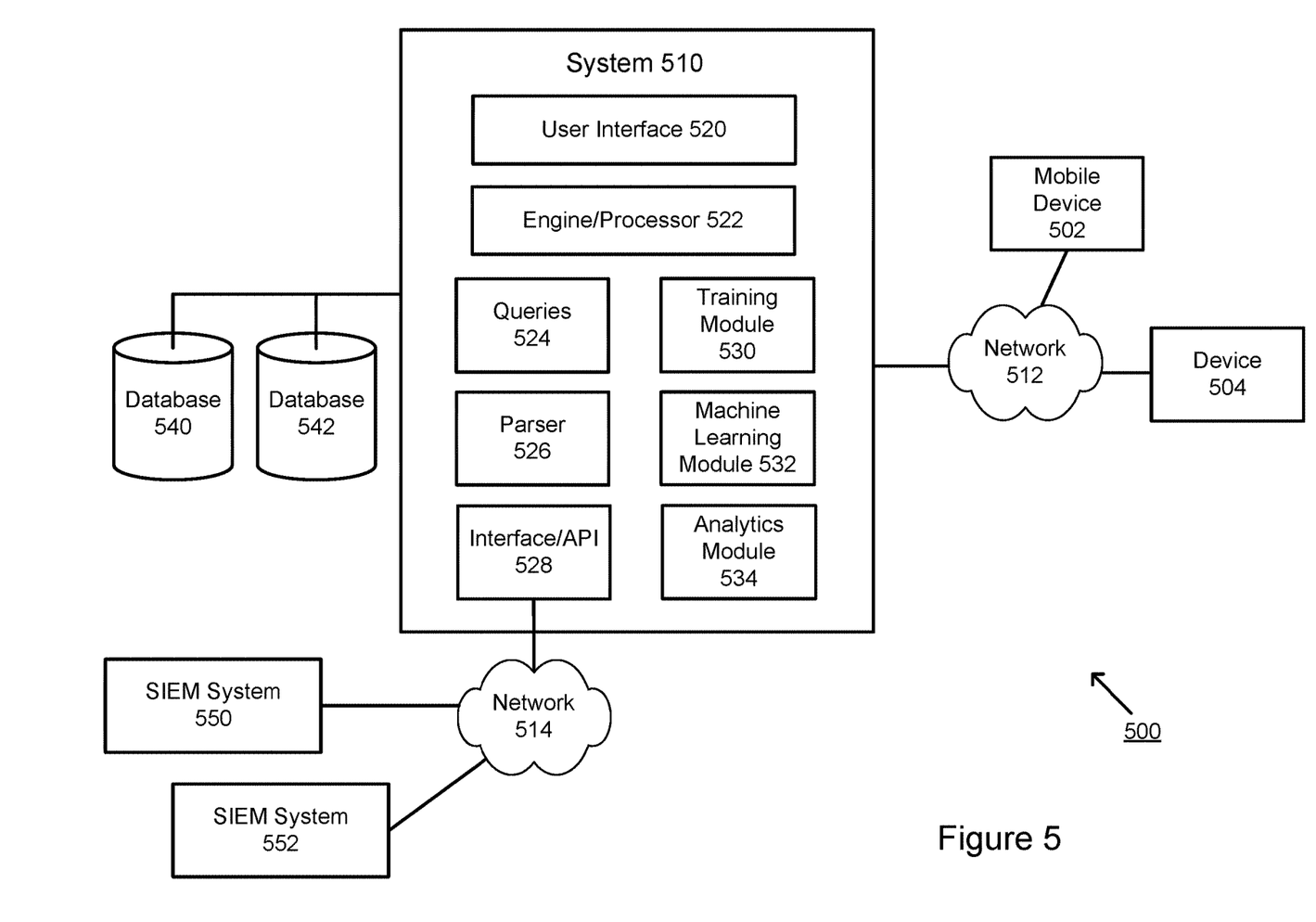
FIG. 5 is an exemplary system diagram, according to an embodiment of the present invention.

FIG. 5 is an exemplary system diagram, according to an embodiment of the present invention. System 510 executes and supports predictive investigation queries based on prior investigations through various configurations and architectures. In addition, Mobile Device 502 may be integrated with System 510 where processing occurs on the mobile device itself. System 510 may communicate and integrate with various other devices represented by 504.

Users may include analysts, such as Security Operations Center (SOC) analysts. As shown in FIG. 5, an analyst may investigate an incident identified by a SIEM or other incident alerting system. An embodiment of the present invention may identify a query or a set of queries used by the analyst and then parse each query to identify static parameters and/or variables.

When a new alert is generated, an embodiment of the present invention may identify an incident associated with the new alert and then determine whether the alert is similar to an incident that has been analyzed and processed. If a similar incident has been identified, an embodiment of the present invention may identify one or more queries and then automatically execute the one or more queries against the incident. With an embodiment of the present invention, the analyst may view results of the one or more queries to obtain information. This enables the analyst (regardless of skillset or experience) to more efficiently and accurately perform the investigation.

System 510 may include User Interface 520 that supports various interactions on devices including mobile devices, other devices, computers, laptops, tablets, etc. User Interface 520 may enable users and/or other entities to interact with Engine/Processor 522. User Interface 520 may support various applications including browsers, mobile interfaces, dashboards, interactive interfaces, etc.

Engine/Processor 522 may support various functions and processes via modules including Queries 524, Parser 526, Interface/API 528, Training Module 530, Machine Learning Module 532, Analytics Module 534, etc. Other functions and features may be supported in various forms and implementations.

Queries 524 may identify queries that apply to a new incident based on similarities with prior investigations. Each incident in the SIEM may be created by rules and populated with data from that query. These incidents may contain useful information that the SOC analyst may then use to determine if this is an actual incident or if additional information is required.

Parser 526 may identify variables and static parameters from queries. For example, variables may represent portions of a query that change for an incident whereas static parameters remain the same across incidents.

Interface/API 528 may communicate with one or more SIEM systems, as represented by SIEM System 550 and SIEM System 552. Other systems and sources of data may be integrated or in communication with System 510.

Training Module 530 may apply training data to improve prediction accuracy. The investigation process may be used to train and implement a machine learning model to suggest to analysts which investigative queries to run based on the incident.

These investigative actions may be used to train a supervised learning model that suggests which additional queries analysts should run to best investigate incidents by adding comments to the incidents based on which additional queries have been used to investigate similar incidents in the past. According to an embodiment of the present invention, the machine learning model may continually improve upon itself as analysts continue to perform their investigations.

Upon incident creation, Training Module 530 may determine additional queries necessary to perform investigation. Training Module 530 may also run additional investigation queries. Using successfully investigated incidents, Training Module 530 may train a supervised learning model based on incidents and which investigation queries were used for them.

Upon incident creation, an embodiment of the present invention may run machine learning model on incident characteristics, as shown by Machine Learning Module 532. For example, output from Machine Learning Module 532 may be formatted into a narrative detailing suggested investigation queries for the incident. In addition, the narrative may be provided as a comment or other inclusion to the incident.

An embodiment of the present invention may consider comments that are added to the queries. Comments may be provided by an experienced analyst to provide explanation and understanding behind the query. Comments may provide guidance, warning and other instructions and insights that may not be evident or readily ascertainable from the query itself. With an embodiment of the present invention, the parsing step may be extended to analyze comments in the existing queries.

Analytics Module 534 may track and analyze data relating to queries, analysts and result data. Analytics Module 534 may also be used to validate and generate new datasets to train and refine models.

When investigating incidents within SIEM systems, analysts may interact with System 510 to perform various actions. Such actions may involve analyzing the data mapped directly to each incident; determining what additional data would provide more context to the incident based on its characteristics; and executing additional queries to gather this necessary data to define next steps on how to handle each incident.

System 510 may store and manage data in various formats, including Databases 540, 542. Data may relate to queries, analysts who ran the queries, results, etc. System 510 may be communicatively coupled to Databases 540, 542. Databases 540, 542 may include any suitable data structure to maintain the information and allow access and retrieval of the information. Databases 540, 542 may be any suitable storage device or devices. The storage may be local, remote, or a combination thereof with respect to Databases 540, 542. Databases 540, 542 may have back-up capability built-in. Communications with Databases 540, 542 may be over a network, or communications may involve a direct connection between Databases 540, 542 and System 510, as depicted in FIG. 5. Databases 540, 542 may also represent cloud or other network based storage.

Networks may be a wireless network, a wired network or any combination of wireless network and wired network. Although Networks 512, 514 are depicted as one network for simplicity, it should be appreciated that according to one or more embodiments, Networks 512, 514 may comprise a plurality of interconnected networks, such as, for example, a service provider network, the Internet, a cellular network, corporate networks, or even home networks, or any of the types of networks mentioned above. Data may be transmitted and received via Networks 512, 514 utilizing a standard networking protocol or a standard telecommunications protocol.

While FIG. 5 illustrates individual devices or components, it should be appreciated that there may be several of such devices to carry out the various exemplary embodiments. Users may communicate with various entities using any mobile or computing device, such as a laptop computer, a personal digital assistant, a smartphone, a smartwatch, smart glasses, other wearables or other computing devices capable of sending or receiving network signals.

The system 500 of FIG. 5 may be implemented in a variety of ways. Architecture within system 500 may be implemented as hardware components (e.g., module) within one or more network elements. It should also be appreciated that architecture within system 500 may be implemented in computer executable software (e.g., on a tangible, non-transitory computer-readable medium) located within one or more network elements. Module functionality of architecture within system 500 may be located on a single device or distributed across a plurality of devices including one or more centralized servers and one or more mobile units or end user devices. The architecture depicted in system 500 is meant to be exemplary and non-limiting. For example, while connections and relationships between the elements of system 500 are depicted, it should be appreciated that other connections and relationships are possible. The system 500 described below may be used to implement the various methods herein, by way of example. Various elements of the system 500 may be referenced in explaining the exemplary methods described herein.

Figure 6:
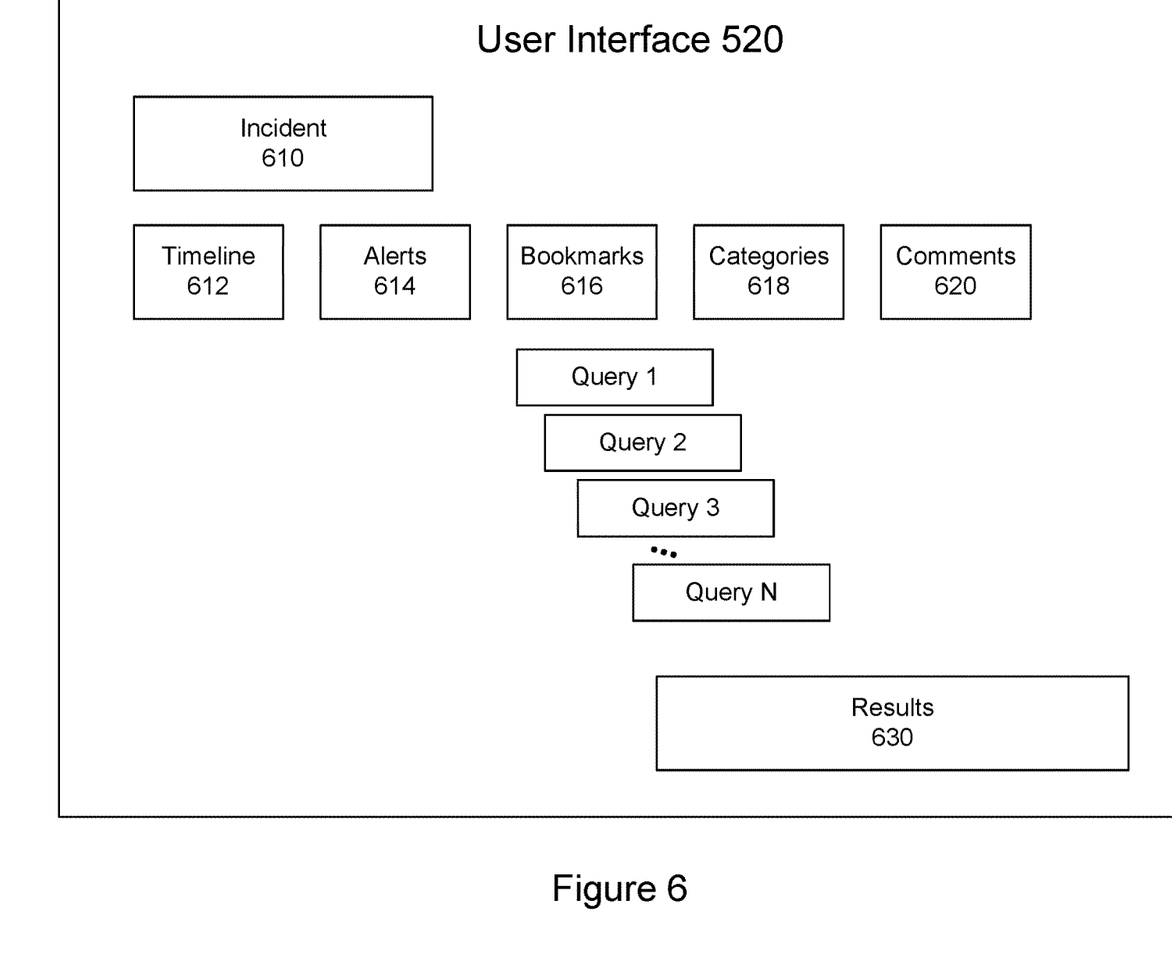
FIG. 6 illustrates an exemplary user interface, according to an embodiment of the present invention.

FIG. 6 illustrates an exemplary user interface, according to an embodiment of the present invention. An analyst or other user may interact with a system of an embodiment of the present invention through an interactive user interface. As shown in FIG. 6, User Interface may include various graphics, icons and/or other interactive components and interfaces. User Interface may include details relating to Incident 610, including Timeline 612, Alerts 614, Bookmarks 616, Categories 618 and Comments 620.

As shown in FIG. 6, a user interface may provide various levels of incident details and data. The user interfaces are exemplary only; other variations and modifications may be realized for various use cases and applications.

Upon identification of a similar past investigation, an embodiment of the present invention may automatically run queries with updated variables and save those queries for the analyst to view and analyst. The queries may be presented by Query 1, Query 2, Query 3 and Query N. Query results may be provided through an interface as shown by 630.

Example queries may include Security Alert, Cloud Platform Activity, Time-based Query, Threat Intelligence Indicator. An exemplary Security Alert query may be based on a specific system alert identifier. A Cloud Platform Activity query may involve accessing a security insights source using an Operation Name Value. A Time-Based Query may use a query_now parameter to represent a time at which a scheduled analytics rule ran to produce an alert. A Threat Intelligence Indicator query may access a particular source system, such as a security graph, to identify a particular network IP address.

Results 630 may provide output information in various formats. For a Security Alert, an exemplary output may include: Event Type (e.g., account, IP, host, etc.), System Alert Identifier, Address, Display Name, etc. For a Cloud Platform Activity, an exemplary output may contain: Time Generated, Caller IP Address, Category Value, Correlation Identifier, etc. For a Time-Based Query, an output may include: Network Analytics Time Generated; IP Entity, timestamp, IP custom entity, etc. For a Threat Intelligence Indicator, an output may contain: time generated, action (e.g., alert), activity group name and additional information.

An embodiment of the present invention may be extended to various user interfaces and interactions. For example, an embodiment of the present invention may detect user interactions with other sources of data and systems. The external system data may be identified and further used to enhance the incident investigation.

For example, a user interface may include a virtual reality embodiment where a user may interact with a SIEM and also other systems and sources of information. A virtual reality lens or headset may detect a user's interaction with other systems. For example, a virtual reality headset may identify where the user looks and interacts through eye movement detection. The system may identify that the user is engaging another source of information through eye movement. An embodiment of the present invention may gather and aggregate data from various sources relating to SIEM systems through a consolidated user interface. An embodiment of the present invention may be expanded to other virtual reality tools and systems.

It will be appreciated by those persons skilled in the art that the various embodiments described herein are capable of broad utility and application. Accordingly, while the various embodiments are described herein in detail in relation to the exemplary embodiments, it is to be understood that this disclosure is illustrative and exemplary of the various embodiments and is made to provide an enabling disclosure. Accordingly, the disclosure is not intended to be construed to limit the embodiments or otherwise to exclude any other such embodiments, adaptations, variations, modifications and equivalent arrangements.

The foregoing descriptions provide examples of different configurations and features of embodiments of the invention. While certain nomenclature and types of applications/hardware are described, other names and application/hardware usage is possible, and the nomenclature is provided by way of non-limiting examples only. Further, while particular embodiments are described, it should be appreciated that the features and functions of each embodiment may be combined in any combination as is within the capability of one skilled in the art. The figures provide additional exemplary details regarding the various embodiments.

Various exemplary methods are provided by way of example herein. The methods described can be executed or otherwise performed by one or a combination of various systems and modules.

The use of the term computer system in the present disclosure can relate to a single computer or multiple computers. In various embodiments, the multiple computers can be networked. The networking can be any type of network, including, but not limited to, wired and wireless networks, a local-area network, a wide-area network, and the Internet.

According to exemplary embodiments, the System software may be implemented as one or more computer program products, for example, one or more modules of computer program instructions encoded on a computer-readable medium for execution by, or to control the operation of, data processing apparatus. The implementations can include single or distributed processing of algorithms. The computer-readable medium can be a machine-readable storage device, a machine-readable storage substrate, a memory device, or a combination of one or more them. The term "processor" encompasses all apparatus, devices, and machines for processing data, including by way of example a programmable processor, a computer, or multiple processors or computers. The apparatus can include, in addition to hardware, software code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed for execution on one computer or on multiple computers that are located at one site or distributed across multiple sites and interconnected by a communications network.

A computer may encompass all apparatus, devices, and machines for processing data, including by way of example a programmable processor, a computer, or multiple processors or computers. It can include, in addition to hardware, code that creates an execution environment for the computer program in question, e.g., code that constitutes processor firmware, a protocol stack, a database management system, an operating system, or a combination of one or more of them.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Computer-readable media suitable for storing computer program instructions and data can include all forms of nonvolatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While the embodiments have been particularly shown and described within the framework for conducting analysis, it will be appreciated that variations and modifications may be affected by a person skilled in the art without departing from the scope of the various embodiments. Furthermore, one skilled in the art will recognize that such processes and systems do not need to be restricted to the specific embodiments described herein. Other embodiments, combinations of the present embodiments, and uses and advantages of the will be apparent to those skilled in the art from consideration of the specification and practice of the embodiments disclosed herein. The specification and examples should be considered exemplary.

What is claimed is:

1. A computer-implemented system for predicting investigation queries based on prior investigations, the system comprising:

an interactive user interface that is configured to receive one or more inputs;

an interface that communicates with a security information and event management (SIEM) system; and a computer processor executing on a computer server and coupled to the interactive user interface and the interface, the computer processor further configured to perform the steps of:

receiving, via an input interface, a new alert relating to an incident event wherein the incident event comprises one or more data items that are classifiable into a plurality of category types;

determining a category type for each data item;

determining, via the computer processor, whether the new alert is similar to a prior investigation into a security incident in SIEM, based on a comparison of the category type for each data item with a set of category types associated with a prior query for the prior investigation;

responsive to the new alert having the set of category types that match the one or more category types, identify one or more parsed queries from the prior investigation;

identifying one or more associated factors for each of the one or more parsed queries;

based on the new alert, updating one or more variables associated with the parsed query;

ranking the one or more parsed queries based on the one or more associated factors;

initiating execution of the one or more parsed queries based on the ranking with updated one or variables via the SIEM system;

receiving and storing results of the executed parsed query; and displaying, via the interactive user interface, the executed parsed query and corresponding results of the parsed query.

2. The system of claim 1, wherein the set of category types match a single category type.

3. The system of claim 1, wherein the set of category types match multiple category types.

4. The system of claim 1, wherein the parsed query comprises at least one static parameter and at least one variable.

5. The system of claim 1, wherein the parsed query is associated with analyst data comprising analyst level and experience.

6. The system of claim 1, wherein the parsed query is associated with mean time to closure data.

7. The system of claim 1, wherein the one or more category types comprise account, file, host and IP address.

8. The system of claim 1, wherein the parsed query comprises a set of queries wherein each query is saved and displayed on the interactive user interface.

9. The system of claim 1, wherein the interface communicates with additional sources of security information.

10. The system of claim 1, wherein the parsed query comprises comments data.

11. A computer-implemented method for predicting investigation queries based on prior investigations, the method comprising the steps of:

receiving, via an input interface, a new alert relating to an incident event wherein the incident event comprises one or more data items that are classifiable into a plurality of category types;

determining a category type for each data item;

determining, via a computer processor, whether the new alert is similar to a prior investigation into a security incident in SIEM, based on a comparison of the category type for each data item with a set of category types associated with a prior query for the prior investigation;

responsive to the new alert having the set of category types that match the one or more category types, identify one or more parsed queries from the prior investigation;

identifying one or more associated factors for each of the one or more parsed queries;

based on the new alert, updating one or more variables associated with the parsed query;

ranking the one or more parsed queries based on the one or more associated factors;

initiating execution of the one or more parsed queries based on the ranking with updated one or variables via a security information and event management (SIEM) system;

receiving and storing results of the executed parsed query; and displaying, via an interactive user interface, the executed parsed query and corresponding results of the parsed query.

12. The method of claim 11, wherein the set of category types match a single category type.

13. The method of claim 11, wherein the set of category types match multiple category types.

14. The method of claim 11, wherein the parsed query comprises at least one static parameter and at least one variable.

15. The method of claim 11, wherein the parsed query is associated with analyst data comprising analyst level and experience.

16. The method of claim 11, wherein the parsed query is associated with mean time to closure data.

17. The method of claim 11, wherein the one or more category types comprise account, file, host and IP address.

18. The method of claim 11, wherein the parsed query comprises a set of queries wherein each query is saved and displayed on the interactive user interface.

19. The method of claim 11, wherein the interface communicates with additional sources of security information.

20. The method of claim 11, wherein the parsed query comprises comments data.

* * * * *